United States Patent
Liu et al.

(10) Patent No.: US 10,160,689 B2
(45) Date of Patent: Dec. 25, 2018

(54) CBS-BASED LTCC MATERIAL AND PREPARATION METHOD THEREOF

(71) Applicant: Shenzhen Sunlord Electronics Co., Ltd., Shenzhen, Guangdong (CN)

(72) Inventors: Jian Liu, Guangdong (CN); Min Nie, Guangdong (CN)

(73) Assignee: Shenzhen Sunlord Electronics Co., Ltd., Shenzhen (CN)

(*) Notice: Subject to any disclaimer, the term of this patent is extended or adjusted under 35 U.S.C. 154(b) by 0 days.

(21) Appl. No.: 15/693,423

(22) Filed: Aug. 31, 2017

(65) Prior Publication Data

US 2018/0016192 A1 Jan. 18, 2018

Related U.S. Application Data

(63) Continuation of application No. PCT/CN2017/092466, filed on Jul. 11, 2017.

(30) Foreign Application Priority Data

Jul. 12, 2016 (CN) .......................... 2016 1 0546322

(51) Int. Cl.
| | | |
|---|---|---|
| *C04B 35/22* | (2006.01) | |
| *C04B 35/626* | (2006.01) | |
| *C04B 35/63* | (2006.01) | |
| *C04B 35/64* | (2006.01) | |
| *B28B 3/02* | (2006.01) | |
| *B28B 11/24* | (2006.01) | |

(52) U.S. Cl.
CPC ............... *C04B 35/22* (2013.01); *B28B 3/02* (2013.01); *B28B 11/243* (2013.01); *C04B 35/6262* (2013.01); *C04B 35/62645* (2013.01); *C04B 35/6303* (2013.01); *C04B 35/64* (2013.01); *C04B 2235/3208* (2013.01); *C04B 2235/3239* (2013.01); *C04B 2235/3281* (2013.01); *C04B 2235/34* (2013.01); *C04B 2235/3409* (2013.01); *C04B 2235/3454* (2013.01); *C04B 2235/5454* (2013.01); *C04B 2235/604* (2013.01); *C04B 2235/6562* (2013.01)

(58) Field of Classification Search
CPC ................ C04B 35/22; C04B 35/6262; C04B 35/62645
See application file for complete search history.

(56) References Cited

U.S. PATENT DOCUMENTS

| | | | |
|---|---|---|---|
| 5,258,335 A | 11/1993 | Muralidhar et al. | |
| 2018/0057395 A1* | 3/2018 | Liu | ..................... C03C 10/0054 |

FOREIGN PATENT DOCUMENTS

| CN | 1389415 A | 1/2003 |
|---|---|---|
| CN | 1872753 A | 12/2006 |
| CN | 101200348 A | 6/2008 |
| CN | 101624263 A | 1/2010 |
| CN | 102173587 A | 9/2011 |
| CN | 102531570 A | 7/2012 |
| CN | 102584234 A | 7/2012 |
| CN | 105541319 A | 5/2016 |
| CN | 106187141 A | 12/2016 |

OTHER PUBLICATIONS

Zhu, Jianguo et al., Electronics and Photoelectron Material, Aug. 31, 2007, 1st Edition, pp. 33-34, Sections 1-2.
Yang, Shilin et al., Study on CaO—B2O3—SiO2 LTCC Materials Prepared by Solid State Reaction Technique, Piezoelectrics & Acoustooptics, Aug. 31, 2012, pp. 609-613, vol. 34, No. 4.

* cited by examiner

*Primary Examiner* — Karl E Group

(57) ABSTRACT

Disclosed is a CBS-based low-temperature co-fired ceramic (LTCC) material, and a preparation method thereof. The material has, as a main component, a sintered phase of low dielectric constant of $CaSiO_3$ and $CaB_2O_4$, and comprises CBS and a dopant. The CBS comprises, by weight, 30-40% of CaO, 15-30% of $B_2O_3$, and 40-50% of $SiO_2$, and the dopant comprises 0-2% of $P_2O_5$, 0-2% of nanometer CuO, and 0.5-2% of nanometer $V_2O_5$. The preparation method comprises mixing oxides including a CBS-based dielectric ceramic as a base and one or two of $P_2O_5$ and CuO as an initial dopant, and then adding $V_2O_5$ as a final sintering aid, to prepare the material. In the present invention, a CBS-based LTCC material that is obtained by sintering at a low temperature and has the advantages of low dielectric constant, low loss, and good overall performance is provided.

9 Claims, 3 Drawing Sheets

CBS-BASED LTCC MATERIAL AND PREPARATION METHOD THEREOF

CROSS REFERENCE TO RELATED APPLICATIONS

This application is a continuation application of PCT/CN2017/092466 filed on Jul. 11, 2017, which claims the benefit of Chinese patent application No. 201610546322.5 filed on Jul. 12, 2016. The contents of the above are all hereby incorporated by reference.

BACKGROUND

Field of the Invention

The present disclosure relates to a material for an electronic device, and more particularly to a CBS (CaO—$B_2O_3$—$SiO_2$)-based low-temperature co-fired ceramic (LTCC) material, and a preparation method thereof.

Related Arts

With the rapid development of modern information technology, higher requirements are imposed on the electronic products in terms of miniaturization, lightweight, multiple functions, reliability, low cost and others. Low Temperature Co-fired Ceramic (LTCC) technology is an advanced passive integrated and hybrid circuit packaging technology, which has become a preferred way to integrate electronic components in the future. In this context, the low-temperature co-firing of the main dielectric materials has also become an important development trend.

In view of the use, the LTCC material needs to have the properties of low dielectric constant, low dielectric loss, high self-resonant frequency, high resistivity, low sintering temperature (≤900° C.), capability of co-firing with an electrode material such as silver and copper, high mechanical performance, and so on. The CaO—$B_2O_3$—$SiO_2$-based LTCC material having wollastonite (β-$CaSiO_3$, dielectric constant $\epsilon_r$=5, dielectric loss tan δ=0.01-0.03%) as a main crystal phase receives great attention due to the excellent dielectric and thermal properties, and the capability of co-sintering with the noble metals Ag and Au at a low temperature (<950° C.). At present, the CBS-based LTCC material is mainly prepared through the following processes.

(1) Solid-phase synthesis—As a traditional electronic ceramic technology, the solid-phase synthesis has the advantages of simple process, no occurrence of composition deviation, high stability, high feasibility of mass production, and low cost, but has high sintering temperature in the event of doping no sintering aid. In "Study on CaO—$B_2O_3$—$SiO_2$ LTCC Materials Prepared by Solid State by Yang Shilin et al from University of Electronic Science and Technology of China, the optimum sintering temperature is up to 950° C. by adjusting the main component CBS. The CBS-based LTCC material prepared through solid-phase synthesis by He Ming et al from University of Electronic Science and Technology of China by adding the nucleating agents $TiO_2$ and $ZrO_2$ also has a sintering temperature of up to 950° C. The too high sintering temperature causes high energy consumption, which go against the co-sintering with Ag at a low temperature. Therefore, this limits the application of CBS in LTCC to a certain extent.

(2) High-temperature sintering—High-temperature sintering is a process in which the initial raw materials are mixed evenly, melted into a liquid at a high temperature, and then quenched in water to form glass; and the glass is ground into a fine material, thermally treated at 850° C. (crystallization and nucleation) to obtain "glass-ceramic". However, $B_2O_3$ is volatile in the melting process, causing the composition to deviate from the formula designed. This harms the performance. Meanwhile, the instability existing in the glass preparation may easily lead to the instability between batches during the mass production of the powder. Therefore, the stability and reliability are difficult to control.

(3) Sol-gel process—Sol-gel process is a method in which a lipid containing the glass component is hydrolyzed into a gel, which is dried and thermally treated to obtain a glass-ceramic material. However, there are problems such as high preparation cost, complicated heat treatment and difficult mass production.

SUMMARY

In order to overcome the disadvantages existing in the prior art, the present disclosure mainly aims at providing a CBS-based LTCC material that is obtained by sintering at a low temperature and has the advantages of low dielectric constant, low loss, and good overall performance, and a preparation method thereof.

To achieve the above objectives, the following technical solutions are adopted in the present disclosure.

A CBS-based low-temperature co-fired ceramic material has, as a main component, a sintered phase of low dielectric constant of $CaSiO_3$ and $CaB_2O_4$ comprising CBS and a dopant, where the CBS comprises, by weight, 30-40% of CaO, 15-30% of $B_2O_3$, and 40-50% of $SiO_2$, and the dopant comprises 0-2% of $P_2O_5$, 0-2% of nanometer CuO, and 0.5-2% of nanometer $V_2O_5$.

A method for preparing a CBS-based LTCC material comprises: mixing a CBS-based dielectric ceramic as a base with one or two of $P_2O_5$ and CuO as an initial dopant, and then adding $V_2O_5$ as a final sintering aid, to prepare the material. The material has, as a main component, a sintered phase of low dielectric constant of $CaSiO_3$ and $CaB_2O_4$ comprising CBS and a dopant, where the CBS comprises, by weight, 30-40% of CaO, 15-30% of $B_2O_3$, and 40-50% of $SiO_2$, and the dopant comprises 0-2% of $P_2O_5$, 0-2% of nanometer CuO, and 0.5-2% of nanometer $V_2O_5$.

Further, the preparation method comprises the steps of (1) material mixing weighing the raw materials $CaCO_3$, $H_3BO_3$, and $SiO_2$ based on 30-40% of CaO, 15-30% of $B_2O_3$, and 40-50% of $SiO_2$, and doping based on CBS-x wt % $P_2O_5$-y wt % CuO, where x=0-2 and y=0-2 chemical stoichiometric proportion, mixing and ball milling where the ball milling medium is deionized water and zirconia balls, then drying the CBS mixture in an oven, grinding, and sieving through a 60-mesh screen;

(2) pre-sintering pre-sintering the sieved CBS powder obtained in Step (1), holding for a pre-determined period of time, cooling to room temperature, then grinding, and sieving;

(3) secondary mixing mixing the sieved pre-sintered powder obtained in Step (2) with $V_2O_5$ based on (CBS-xwt % $P_2O_5$-ywt % CuO)-zwt % $V_2O_5$, where z=0.5-2 chemical stoichiometric proportion, ball milling after mixing where the ball milling medium is deionized water and zirconia balls, then drying the ground powder in an oven, grinding, and sieving through a 60-mesh screen;

(4) secondary pre-sintering pre-sintering the sieved final CBS powder obtained in Step (3), holding for a pre-determined period of time, and cooling to room temperature;

(5) tertiary grinding subjecting the secondarily pre-sintered CBS powder obtained in Step (4) to ball milling until a desired range of particle sizes is attained, drying the CBS mixture, then grinding, and sieving through a 120-mesh screen;

(6) pressing granulating the sieved powder obtained in Step (5) with a granulation solution, sieving, and pressing the fine powder into a green body;

(7) glue discharge; and (8) sintering.

Further, the doped CuO has an average particle size of 60-100 nm, and the $V_2O_5$ has an average particle size of 80-100 nm Further, the desired range of particle sizes described in Step (5) is 0.5-1 μm.

Further, in the ball milling in Steps (1), (3), and (5), the weight ratio of material:ball:water is 1:2:1; in Step (1), the ball milling time is 3 hrs, and the rotational speed of the ball mill is 250 rpm; in Step (3), the ball milling time is 3 hrs, and the rotational speed of the ball mill is 250 rpm; and in Step (5), the ball milling time is 4 hrs, and the rotational speed of the ball mill is 350 rpm.

Further, in Step (2), the pre-sintering occurs at 800° C., and the holding time is 6 hrs.

Further, in Step (4), the pre-sintering occurs at 800° C., and the holding time is 4 hrs.

Further, in Step (6), the sieved powder obtained in Step (5) is granulated with a 5 wt % solution of polyvinyl alcohol in water, and sieved through a 120-mesh screen, and the fine powder is pressed into a green body, wherein the press pressure is 260 MPa, and the press time is 20 s.

Further, in Step (7), the green body obtained in Step (6) is placed in a muffle furnace, heated to 500° C. at a ramp rate of 1.5° C./min, and held for 2 hrs, to discharge the organics; and Further, in Step (8), the green body after glue discharge obtained in Step (7) is placed in a muffle furnace, sintered by heating to 850-900° C. at a ramp rate of 5° C./min, and held for 2 hrs, and then naturally cooled to room temperature with the furnace.

The present disclosure has the following beneficial effects.

By means of the CBS-based LTCC material and the preparation method thereof provided in the present disclosure, the drawback of too high sintering temperature in the solid-phase synthesis of CBS can be overcome, and a microwave dielectric ceramic that is obtained by sintering at a low temperature and has a low dielectric constant, a low loss, and a relatively good overall performance is provided by adding a sintering aid (low-melting-point nanometer oxide) and adjusting the process, so as to meet the requirements of LTCC filters and LTCC substrates.

In the present disclosure, a microwave dielectric ceramic that is obtained by sintering at a low temperature and has a low dielectric constant $\in_r$ of 5.8-6.5, a low loss tan δ of 0.2% or less (frequency within 100 GHz), a relatively good overall performance, and a high stability is provided by mixing oxides including a CBS-based dielectric ceramic as a base and one or two of $P_2O_5$ and CuO as an initial dopant, and then adding $V_2O_5$ as a final sintering aid, and by adjusting and improving the formula and the process, so as to meet the requirements of LTCC filters and LTCC substrates. The CBS-based LTCC material of the present disclosure can be massively produced, and co-sintered with the noble metals Ag and Au at a low temperature, and can find wide use in the LTCC filters, LTCC substrates, and other areas.

BRIEF DESCRIPTION OF THE DRAWINGS

The present disclosure will become more fully understood from the detailed description given herein below for illustration only, and thus are not limitative of the present invention, and wherein.

DETAILED DESCRIPTION

Figure 1:
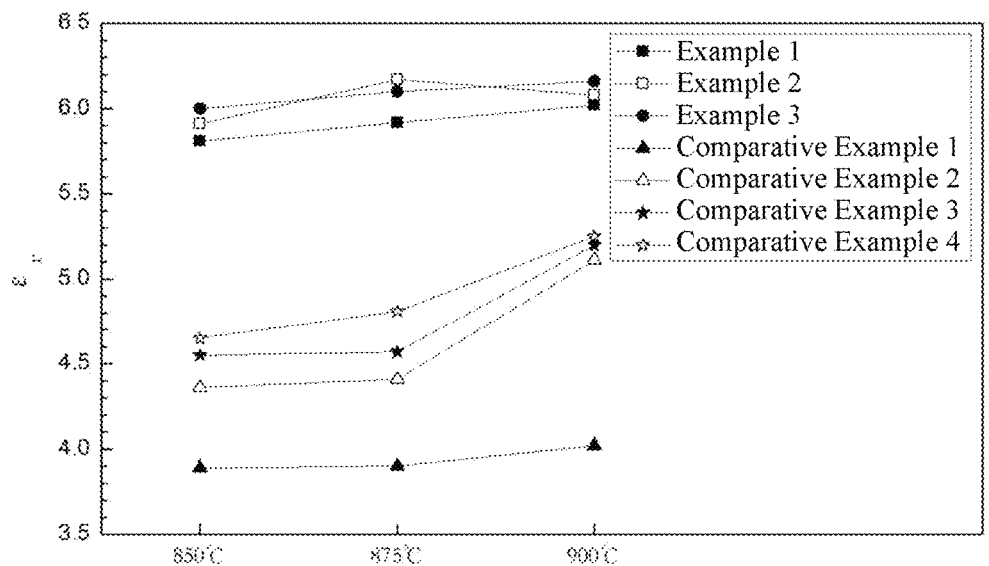
FIG. 1 is a curve showing the change of the dielectric constant with the dopant content and the sintering temperature in Examples 1-3 and Comparative Examples 1-4.
Figure 2A:
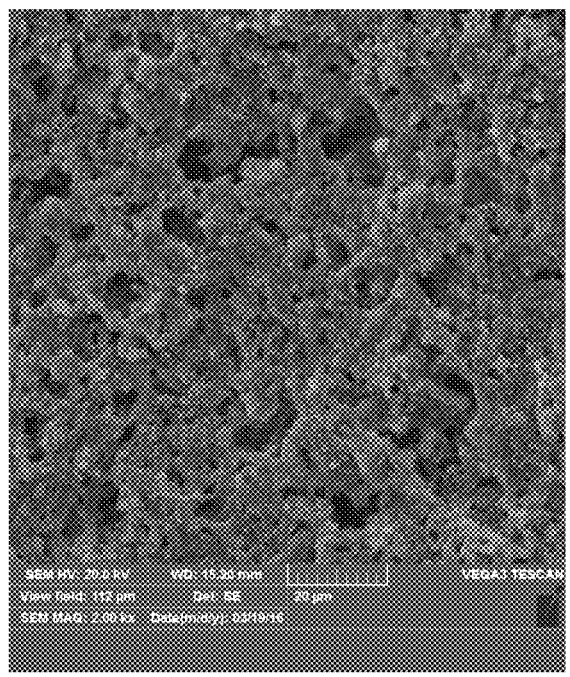
FIGS. 2A to 2D are respectively the micrographs at the cross section of the samples of CBS-based LTCC materials prepared in Comparative Example 3-2, Comparative Example 4-2, Example 2-2, and Example 3-2 after being sintered at 875° C. for 2 hrs.
Figure 2B:
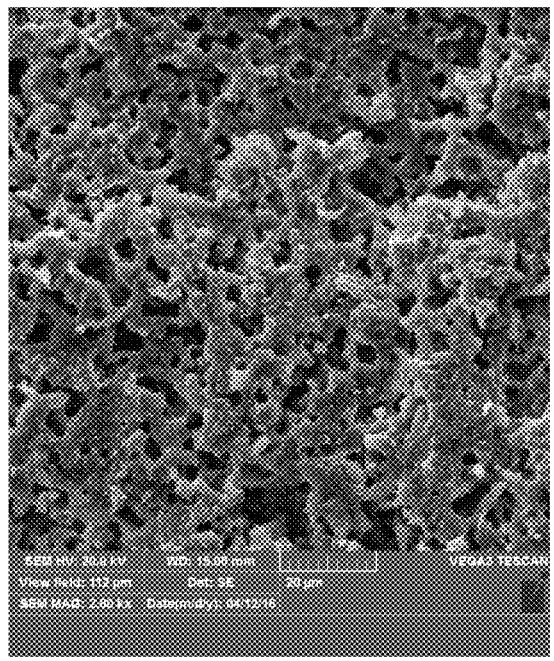
Figure 2C:
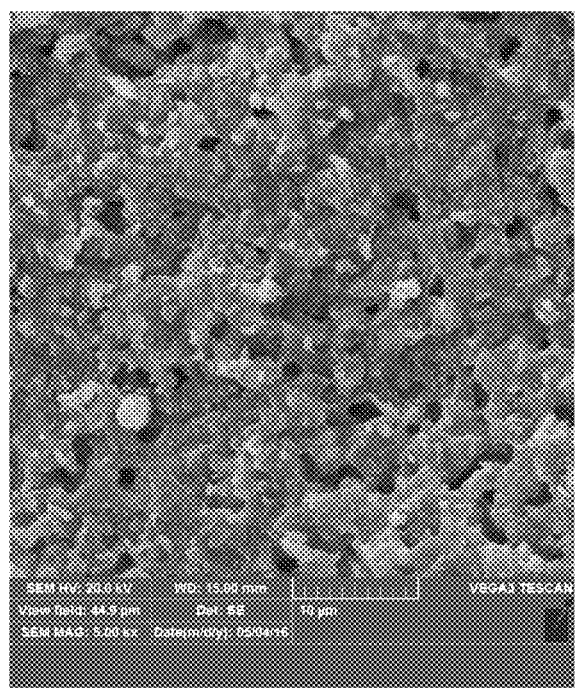
Figure 2D:
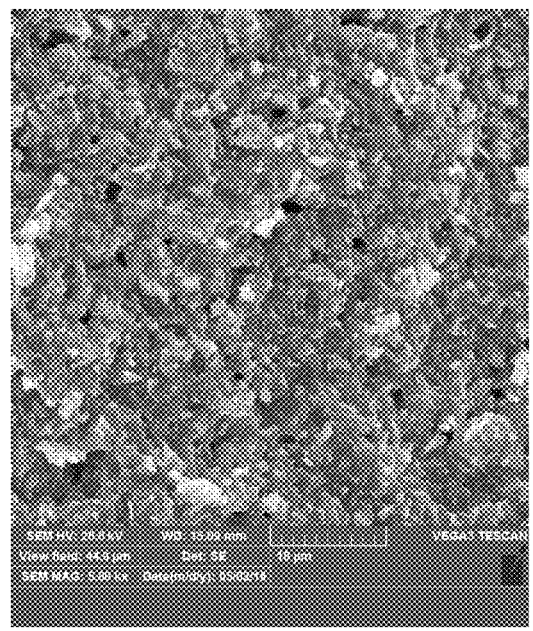

The present disclosure is described in further detail below with reference to embodiments and the accompanying drawings. It should be noted that the following description is merely exemplary and is not intended to limit the scope of the present application.

In an embodiment, a CBS-based low-temperature co-fired ceramic material has, as a main component, a sintered phase of low dielectric constant of $CaSiO_3$ and $CaB_2O_4$, and comprises CBS and a dopant, where the CBS comprises, by weight, 30-40% of CaO, 15-30% of $B_2O_3$, and 40-50% of $SiO_2$, and the dopant comprises 0-2% of $P_2O_5$, 0-2% of nanometer CuO, and 0.5-2% of nanometer $V_2O_5$.

A method for preparing a CBS-based LTCC material comprises mixing a CBS-based dielectric ceramic as a base with one or two of $P_2O_5$ and CuO as an initial dopant, and then adding $V_2O_5$ as a final sintering aid, to prepare the material. The material has, as a main component, a sintered phase of low dielectric constant of $CaSiO_3$ and $CaB_2O_4$, comprising CBS and a dopant, where the CBS comprises, by weight, 30-40% of CaO, 15-30% of $B_2O_3$, and 40-50% of $SiO_2$, and the dopant comprises 0-2% of $P_2O_5$, 0-2% of nanometer CuO, and 0.5-2% of nanometer $V_2O_5$.

In a specific embodiment, a method for preparing a CBS-based LTCC material of low dielectric constant and loss comprises the steps of:

(1) material mixing weighing the raw materials $CaCO_3$, $H_3BO_3$, and $SiO_2$ based on 30-40% of CaO, 15-30% of $B_2O_3$, and 40-50% of $SiO_2$, and doping based on CBS-x wt % $P_2O_5$-y wt % CuO, where x=0-2 and y=0-2 chemical stoichiometric proportion, mixing, and ball milling in a ball mill jar where the ball milling medium is deionized water and zirconia balls and the weight ratio of material:ball:water is 1:2:1, then drying the CBS mixture in an oven at 100° C., grinding in an agate mortar, and sieving through a 60-mesh screen;

(2) pre-sintering placing the sieved CBS powder obtained in Step (1) in a crucible, compacting, covering, sealing, pre-sintering and holding in a muffle furnace at 800° C. for 6 hrs, then naturally cooling to room temperature with the furnace, grinding in an agate mortar, and sieving through a 60-mesh screen;

(3) secondary mixing mixing the sieved pre-sintered powder obtained in Step (2) with $V_2O_5$ based on (CBS-xwt % $P_2O_5$-ywt % CuO)-zwt % $V_2O_5$, where z=0.5-2 chemical stoichiometric proportion, ball milling in a ball mill jar after mixing where the ball milling medium is deionized water and zirconia balls, and the weight ratio of material:ball:water is 1:2:1, then drying the ground powder in an oven at 100° C., grinding in an agate mortar, and sieving through a 60-mesh screen;

(4) Secondary pre-sintering placing the sieved final CBS powder obtained in Step (3) in a crucible, compacting, covering, sealing, pre-sintering and holding in a muffle furnace at 800° C. for 4 hrs, and then naturally cooling to room temperature with the furnace;

(5) tertiary grinding subjecting the secondarily pre-sintered CBS powder obtained in Step (4) to ball milling in a ball mill jar until a desired range of particle sizes is attained, where the weight ratio of material:ball:water is 1:4:1, drying the CBS mixture in an oven at 100° C., grinding in an agate mortar, and sieving through a 60-mesh screen;

(6) pressing granulating the sieved powder obtained in Step (5) with a 5 wt % solution of polyvinyl alcohol in water, sieving through a 120-mesh screen, and pressing the fine powder into a green body;

(7) glue discharge placing the green body obtained in Step (6) in a muffle furnace, heating to 500° C. at a ramp rate of 1.5° C./min, and holding for 2 hrs, to discharge the organics;

(8) sintering placing the green body after glue discharge obtained in Step (7) in a muffle furnace, sintering by heating to 850-900° C. at a ramp rate of 5° C./min, holding for 2 hrs, and then naturally cooling to room temperature with the furnace; and (9) microwave performance test Standing the dielectric ceramic sintered in Step (8) for 12 hrs at room temperature, and testing for the $\epsilon_r$ and tan δ by using Agilent E5071C network analyzer.

In Step (1), the raw materials comprise $CaCO_3$, $H_3BO_3$, $SiO_2$, $P_2O_5$, CuO, and $V_2O_5$, the nanometer CuO has an average particle size of 60-100 nm, and the nanometer $V_2O_5$ has an average particle size of 80-100 nm.

In Step (1), the ball milling time is 3 hrs, and the rotational speed of the ball mill is 250 rpm.

In Step (3), the ball milling time is 3 hrs, and the rotational speed of the ball mill is 250 rpm.

In Step (5), the ball milling time is 4 hrs, and the rotational speed of the ball mill is 350 rpm.

The desired range of particle sizes described in Step (5) is 0.5-1 μm.

In Step (6), the press pressure is 260 MPa, and the press time is 20 s.

In Step (6), the pressed green body is a cylindrical body having a diameter of 14 mm, and a thickness of 6-7 mm.

In Step (9), the CBS-based LTCC material of low-dielectric loss has the properties of $\epsilon_r$=5.8-6.2 and Tan δ<0.2%.

The dopant contents in various specific examples and comparative examples are shown in Table 1.

TABLE 1

Dopant contents in examples and comparative examples

| | x | y | z | Remark |
|---|---|---|---|---|
| Example 1 | 1 | 0 | 1.2 | Sintered at 850° C., 875° C., and 900° C., and designated as Examples 1-1, 1-2, and 1-3 respectively |
| Example 2 | 0 | 1 | 1.2 | Sintered at 850° C., 875° C., and 900° C., and designated as Examples 2-1, 2-2, and 2-3 respectively |
| Example 3 | 1 | 1 | 1.2 | Sintered at 850° C., 875° C., and 900° C., and designated as Examples 3-1, 3-2, and 3-3 respectively |
| Comparative Example 1 | 0 | 0 | 0 | Sintered at 850° C., 875° C., and 900° C., and designated as Comparative Examples 1-1, 1-2, and 1-3 respectively |
| Comparative Example 2 | 1 | 0 | 0 | Sintered at 850° C., 875° C., and 900° C., and designated as Comparative Examples 2-1, 2-2, and 2-3 respectively |
| Comparative Example 3 | 0 | 1 | 0 | Sintered at 850° C., 875° C., and 900° C., and designated as Comparative Examples 3-1, 3-2, and 3-3 respectively |
| Comparative Example 4 | 0 | 0 | 1.2 | Sintered at 850° C., 875° C., and 900° C., and designated as Comparative Examples 4-1, 4-2, and 4-3 respectively |

The test results of the appearance after sintering, the shrinkage, the density, the dielectric constant, and the loss of the examples and comparative examples are listed in Table 2.

TABLE 2

Sintering performance of the examples and comparative examples

| | Appearance after sintering | Shrinkage | Density (g/cm³) | 12 GHZ | | Overall performance |
|---|---|---|---|---|---|---|
| | | | | $\epsilon_r$ | tan δ | |
| Example 1-1 | Smooth surface | 15% ± 0.5 | 2.54 | 5.81 | 0.17% | Accepted |
| Example 1-2 | Smooth surface | 16% ± 0.5 | 2.56 | 5.92 | 0.16% | Accepted |
| Example 1-3 | Smooth surface | 16% ± 0.5 | 2.58 | 6.02 | 0.15% | Accepted |
| Example 2-1 | Smooth surface | 15% ± 0.5 | 2.60 | 5.91 | 0.18% | Accepted |
| Example 2-2 | Smooth surface | 16% ± 0.5 | 2.65 | 6.17 | 0.13% | Accepted |
| Example 2-3 | Smooth surface | 15% ± 0.5 | 2.63 | 6.08 | 0.15% | Accepted |
| Example 3-1 | Smooth surface | 15% ± 0.5 | 2.61 | 6.00 | 0.15% | Accepted |
| Example 3-2 | Smooth surface | 16% ± 0.5 | 2.67 | 6.10 | 0.12% | Accepted |
| Example 3-3 | Smooth surface | 15% ± 0.5 | 2.67 | 6.16 | 0.14% | Accepted |
| Comparative Example 1-1 | Rough surface | Less than 3% | 2.00 | 3.89 | 0.30% | Not accepted |
| Comparative Example 1-2 | Rough surface | Less than 3% | 2.01 | 3.90 | 0.30% | Not accepted |
| Comparative Example 1-3 | Rough surface | Less than 3% | 2.01 | 4.02 | 0.29% | Not accepted |
| Comparative Example 2-1 | Rough surface | 5% ± 0.5 | 2.11 | 4.36 | 0.29% | Not accepted |

TABLE 2-continued

Sintering performance of the examples and comparative examples

|  | Appearance after sintering | Shrinkage | Density (g/cm³) | 12 GHZ $\varepsilon_r$ | 12 GHZ tan δ | Overall performance |
|---|---|---|---|---|---|---|
| Comparative Example 2-2 | Rough surface | 5% ± 0.5 | 2.12 | 4.40 | 0.29% | Not accepted |
| Comparative Example 2-3 | Rough surface | 5% ± 0.5 | 2.16 | 5.11 | 0.28% | Not accepted |
| Comparative Example 3-1 | Rough surface | 5% ± 0.5 | 2.14 | 4.55 | 0.26% | Not accepted |
| Comparative Example 3-2 | Rough surface | 5% ± 0.5 | 2.16 | 4.56 | 0.28% | Not accepted |
| Comparative Example 3-3 | Rough surface | 5% ± 0.5 | 2.18 | 5.20 | 0.27% | Not accepted |
| Comparative Example 4-1 | Rough surface | 6% ± 0.5 | 2.13 | 4.65 | 0.29% | Not accepted |
| Comparative Example 4-2 | Rough surface | 6% ± 0.5 | 2.24 | 4.81 | 0.25% | Not accepted |
| Comparative Example 4-3 | Rough surface | 6% ± 0.5 | 2.26 | 5.25 | 0.24% | Not accepted |

Figure 3:
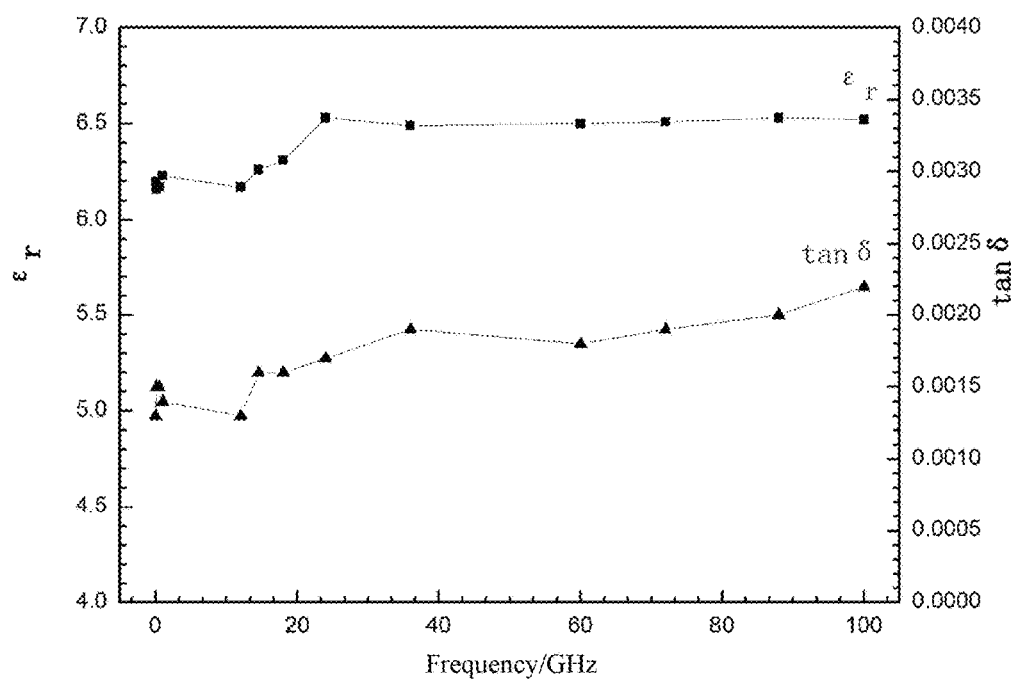
FIG. 3 shows the dielectric constant and dielectric loss of Example 2-2 within 100 GHz.

FIG. 1 is a curve showing the change of the dielectric constant with the dopant content and the sintering temperature in Examples 1-3 and Comparative Examples 1-4. FIGS. 2A to 2D are respectively the micrographs at the cross section of the samples of CBS-based LTCC materials prepared in Comparative Example 3-2, Comparative Example 4-2, Example 2-2, and Example 3-2 after being sintered at 875° C. for 2 hrs. FIG. 3 shows the dielectric constant and dielectric loss of Example 2-2 within 100 GHz.

Densification into a ceramic by sintering at 850-900° C. is achieved in all the examples above, and the prepared CBS-based LTCC material has the properties of $\S_r$=5.8-6.5 and tan δ<0.2%. Example 3-2 is the most preferred example where the loss is the lowest and tan δ=0.12%.

As an initial dopant, $P_2O_5$ and nanometer CuO can facilitate the full formation of a main crystal phase during the pre-sintering of CBS and improve the sintering activity of the powder, and have no adverse effect on CBS when added in an amount of 2 wt % or less. $V_2O_5$ has a melting point of 690° C. and an even higher activity at a nano-scale, facilitates the formation of a liquid phase and the accomplishment of low-temperature sintering as a final sintering aid for the powdered CBS base, and produces no impure phase in CBS when added in an amount of 2 wt % or less. The dielectric constant of the dielectric ceramic mainly depends on the phase type, content and relative density (compactness). Because the dopant content is small, the material in the examples is sintered and shrunk properly at 850-900° C. to form a dense ceramic, and the dielectric constant and loss are stable. Moreover, the logarithmic mixture rule of the dielectric material shows that the more the pore number is (that is, the poor the density is), the lower the dielectric constant is, and the higher the loss is. The data in both the examples and comparative example follows this rule. Therefore, in a CBS system having a certain composition, densification into a ceramic by sintering at 850° C.-900° C., stable dielectric constant, low loss, and good overall performance can be achieved by using (either or both of) $P_2O_5$ and nanometer CuO, and nanometer $V_2O_5$ in combination.

Although the present invention is described above in further detail through specific embodiments, the present invention is not limited to the specific embodiments. It should be understood by persons of ordinary skill in the art that any simple deduction or replacement made without departing from the spirit of the present invention shall fall within the protection scope of the present invention.

What is claimed is:

1. A method for preparing a CBS-based LTCC material, comprising: mixing a CBS-based dielectric ceramic as a base with one or two of $P_2O_5$ and CuO as an initial dopant, then adding $V_2O_5$ as a final sintering aid, and sintering to prepare the material, wherein the material has, as a main component, a sintered phase of low dielectric constant of $CaSiO_3$ and $CaB_2O_4$, wherein the main component is made of CBS and a dopant, wherein the CBS comprises, by weight, 30-40% of CaO, 15-30% of $B_2O_3$, and 40-50% of $SiO_2$, and the dopant comprises one or two of not greater than 2% of $P_2O_5$, and not greater than 2% of nanometer CuO, and 0.5-2% of nanometer $V_2O_5$.

2. The preparation method according to claim 1, comprising the steps of
(1) material mixing
weighing raw materials $CaCO_3$, $H_3BO_3$, and $SiO_2$ based on 30-40% of CaO, 15-30% of $B_2O_3$, and 40-50% of $SiO_2$, and doping based on CBS-x wt % $P_2O_5$-y wt % CuO chemical stoichiometric proportion, where x=0-2, y=0-2 and at least one of x and y greater than 0, mixing and ball milling where ball milling medium is deionized water and zirconia balls, then drying a CBS mixture in an oven, grinding, and sieving through a 60-mesh screen;
(2) pre-sintering
pre-sintering sieved CBS powder obtained in Step (1), holding for a pre-determined period of time, cooling to room temperature, then grinding, and sieving;
(3) secondary mixing
mixing the sieved pre-sintered powder obtained in Step (2) with $V_2O_5$ based on (CBS-xwt % $P_2O_5$-ywt % CuO)-zwt % $V_2O_5$, where z=0.5-2 chemical stoichiometric proportion, ball milling after mixing where ball milling medium is deionized water and zirconia balls, then drying the ground powder in an oven, grinding, and sieving through a 60-mesh screen;
(4) secondary pre-sintering
pre-sintering sieved final CBS powder obtained in Step (3), holding for a pre-determined period of time, and cooling to room temperature;

(5) tertiary grinding subjecting the secondarily pre-sintered CBS powder obtained in Step (4) to ball milling until a desired range of particle sizes is attained, drying the CBS mixture, then grinding, and sieving through a 120-mesh screen;

(6) pressing granulating the sieved powder obtained in Step (5) with a granulation solution, sieving, and pressing the fine powder into a green body;

(7) glue discharge; and (8) sintering.

3. The preparation method according to claim 2, wherein the CuO has an average particle size of 60-100 nm, and the $V_2O_5$ has an average particle size of 80-100nm.

4. The preparation method according to claim 2, wherein the desired range of particle sizes described in Step (5) is 0.5-1 µm.

5. The preparation method according to claim 2, wherein in the ball milling in Steps (1), (3), and (5), weight ratio of material:ball:water is 1:2:1; in Step (1), ball milling time is 3 hrs, and rotational speed of the ball milling is 250 rpm; in Step (3), ball milling time is 3 hrs, and rotational speed of the ball milling is 250 rpm; and in Step (5), ball milling time is 4 hrs, and rotational speed of the ball milling is 350 rpm.

6. The preparation method according to claim 2, wherein in Step (2), the pre-sintering occurs at 800° C., and the holding time is 6 hrs.

7. The preparation method according to claim 2, wherein in Step (4), the pre-sintering occurs at 800° C., and the holding time is 4 hrs.

8. The preparation method according to claim 2, wherein in Step (6), the sieved powder obtained in Step (5) is granulated with a 5 wt % solution of polyvinyl alcohol in water, and sieved through a 120-mesh screen, and the fine powder is pressed into a green body, wherein the press pressure is 260 MPa, and the press time is 20 s.

9. The preparation method according to claim 2, wherein in Step (7), the green body obtained in Step (6) is placed in a muffle furnace, heated to 500° C. at a ramp rate of 1.5° C./min, and held for 2 hrs, to discharge organics; and in Step (8), the green body after glue discharge obtained in Step (7) is placed in a muffle furnace, sintered by heating to 850-900° C. at a ramp rate of 5° C./min, and held for 2 hrs, and then naturally cooled to room temperature with the furnace.

* * * * *